United States Patent
Soucy

(10) Patent No.: US 8,186,340 B2
(45) Date of Patent: May 29, 2012

(54) SCORE AND FORM SOLAR REFLECTOR

(76) Inventor: Paul B Soucy, Methuen, MA (US)

( * ) Notice: Subject to any disclaimer, the term of this patent is extended or adjusted under 35 U.S.C. 154(b) by 441 days.

(21) Appl. No.: 12/425,526

(22) Filed: Apr. 17, 2009

(65) Prior Publication Data

US 2009/0260621 A1 Oct. 22, 2009

Related U.S. Application Data

(60) Provisional application No. 61/045,679, filed on Apr. 17, 2008.

(51) Int. Cl.
*F24J 2/46* (2006.01)

(52) U.S. Cl. ........ 126/627; 126/682; 126/692; 126/694; 29/890.033; 493/160; 72/31.1

(58) Field of Classification Search .................. 126/627, 126/682, 692, 694; 29/890.033; 72/31.1
See application file for complete search history.

(56) References Cited

U.S. PATENT DOCUMENTS

| | | | | | |
|---|---|---|---|---|---|
| 1,819,283 A | * | 8/1931 | Dodge | .......................... | 362/305 |
| 2,203,697 A | * | 6/1940 | Rinkel | ...................... | 229/116.1 |
| 2,336,565 A | * | 12/1943 | Parmenter | ..................... | 428/446 |
| 2,521,184 A | * | 9/1950 | Paige | ............................. | 206/557 |
| 2,826,352 A | * | 3/1958 | Holtkamp | ..................... | 411/466 |
| 3,026,015 A | * | 3/1962 | Severn | .......................... | 206/600 |
| 3,053,248 A | * | 9/1962 | Daymon | ....................... | 126/681 |
| 3,062,429 A | * | 11/1962 | Liman et al. | ................... | 229/100 |
| 3,333,451 A | * | 8/1967 | Inlow | ............................ | 72/179 |
| 3,793,791 A | * | 2/1974 | Wootten | ....................... | 52/789.1 |
| 3,939,615 A | * | 2/1976 | Sorkin | .......................... | 52/81.6 |
| 3,952,574 A | * | 4/1976 | Speidel | ....................... | 72/379.2 |
| 3,994,275 A | * | 11/1976 | Williams | ..................... | 126/552 |
| 4,001,836 A | * | 1/1977 | Archer et al. | .................. | 343/756 |
| 4,127,926 A | | 12/1978 | White | | |
| 4,178,913 A | * | 12/1979 | Hutchison | ..................... | 126/601 |
| 4,240,406 A | * | 12/1980 | Hutchison | ..................... | 359/867 |
| 4,372,027 A | * | 2/1983 | Hutchison | ....................... | 29/448 |
| 4,423,719 A | * | 1/1984 | Hutchison | ..................... | 126/694 |
| 4,561,423 A | * | 12/1985 | Blasey | .......................... | 126/604 |
| 4,611,575 A | | 9/1986 | Powell | | |
| 5,568,680 A | * | 10/1996 | Parker | ............................ | 29/557 |
| 5,596,981 A | | 1/1997 | Soucy | | |
| 5,979,434 A | * | 11/1999 | Bilanzich | ...................... | 126/204 |
| D444,480 S | * | 7/2001 | Shultz et al. | .................. | D15/90 |
| 6,341,460 B1 | * | 1/2002 | Lalvani | ........................ | 52/311.2 |

(Continued)

FOREIGN PATENT DOCUMENTS

WO WO 9533653 A1 * 12/1995

*Primary Examiner* — Kenneth Rinehart
*Assistant Examiner* — Jorge Pereiro
(74) *Attorney, Agent, or Firm* — Maine Cernota & Rardin

(57) ABSTRACT

A curved surface structure for reflecting solar light, heat or electromagnetic radiation is made by scoring two opposing pairs of curved bend lines along one pair of opposing edges of a sheet of bendable material, dividing it into a center section joined by curved bend lines to curved ribs, joined by curved bend lines to respective curved edges; bending the curved ribs down and curved edges up along the bend lines to nominally right angles to form a curved surface supported by two curved ribs and two curved edges. Two straight ribs and respective straight edges may be scored and formed on the other pair of opposing edges of the sheet. A backside sheet may be applied to the four edges. A widthwise corrugated, elongate right angle reinforcement member may be employed for strengthening the formed bend lines.

14 Claims, 7 Drawing Sheets

U.S. PATENT DOCUMENTS

| | | | |
|---|---|---|---|
| 6,640,605 B2 * | 11/2003 | Gitlin et al. | 72/379.2 |
| 7,464,574 B2 * | 12/2008 | Durney et al. | 72/324 |
| 7,585,096 B2 * | 9/2009 | Fallahi et al. | 362/517 |
| 2002/0184936 A1 * | 12/2002 | Gitlin et al. | 72/379.2 |
| 2004/0134250 A1 * | 7/2004 | Durney et al. | 72/324 |
| 2005/0126110 A1 * | 6/2005 | Durney et al. | 52/720.1 |
| 2007/0113614 A1 * | 5/2007 | Durney et al. | 72/379.2 |
| 2010/0006630 A1 * | 1/2010 | Humphries et al. | 229/117.27 |

* cited by examiner

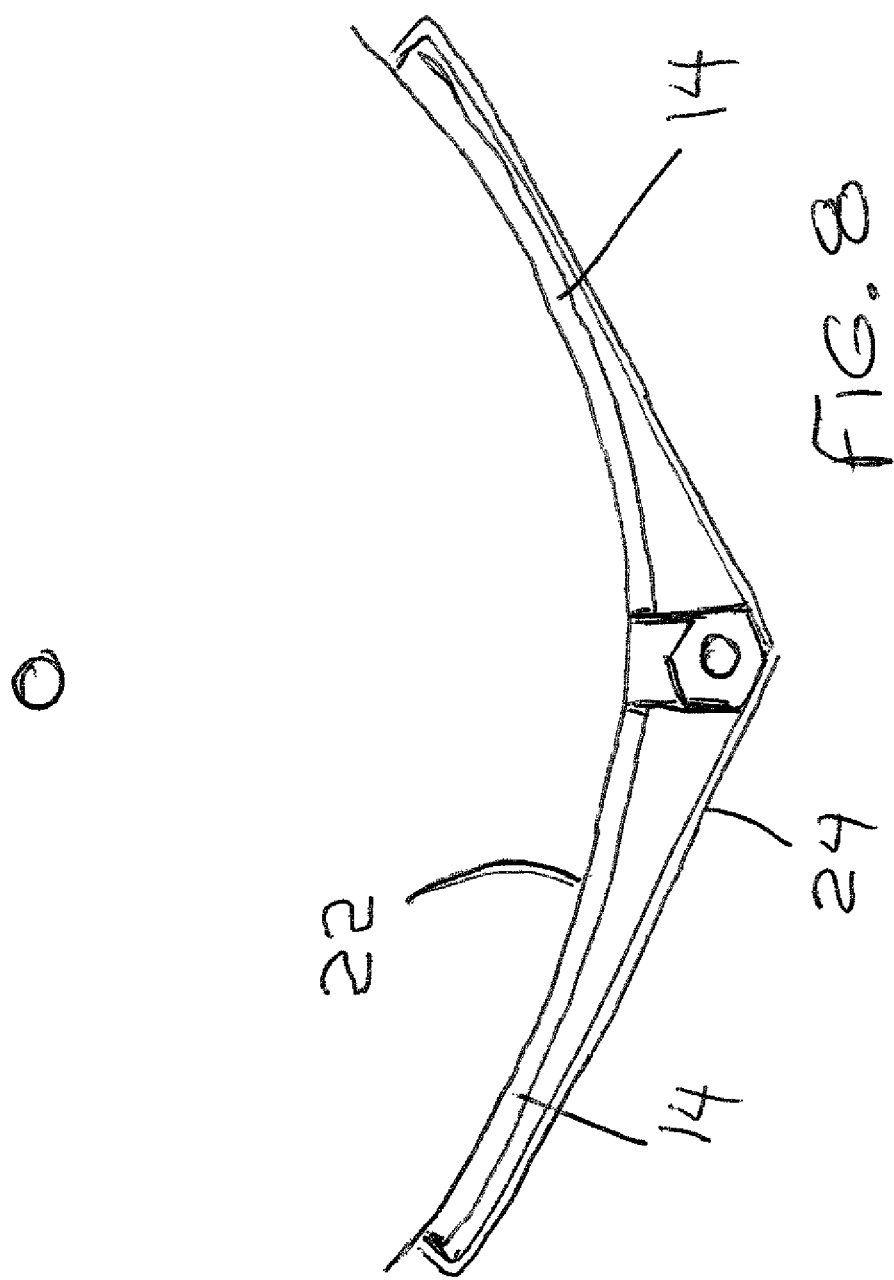

SCORE AND FORM SOLAR REFLECTOR

RELATED APPLICATIONS

This application relates and claims priority for all purposes to pending U.S. application Ser. No. 61/045,679 filed Apr. 17, 2008.

FIELD OF INVENTION

The invention relates to reflectors and methods for forming them, and in particular to curved surface structures for reflecting heat, light or electromagnetic radiation, with curved ribs and a curved surface formed from a single sheet of material.

BACKGROUND OF THE INVENTION

Parallel radiation such as sunlight may be concentrated with lenses or contoured surface reflectors, as is well understood. A trough reflector with a parabolic cross section concentrates sunlight on a line and a parabolic dish reflector concentrates sunlight on a point. Both types of solar reflectors are well understood in the art. Since sunlight radiation is essentially a remote source of parallel light waves, the reflected waves become concentrated at the focal point, or line, of the reflector. The resulting concentration of energy is impressive. A relatively small dish reflector or convex lens positioned under a bright sun can easily generate combustion temperatures at its focus point.

The book, "A Golden Thread: 2500 Years of Solar Architecture and Technology" by Ken Butti and John Perlin: Cheshire Books, 1980, provides an early industrial example of this technology. In 1912, an array of very large parabolic trough collectors, 13 feet in width, were built in Meadi, Egypt, a small farming community on the Nile River 15 miles south of Cairo. Each collector was 204 feet in length. There were five in all. Each collector was fitted with a mechanical tracker which kept it automatically tilted properly toward the sun.

The heat generated in water pipes running along the line of focus of this reflector array was used to produce steam which drove a series of large water pumps. Together they produced the equivalent of 55 horsepower. They were capable of pumping 6000 gallons of water per minute, bringing irrigation water to vast areas of arid desert land. World War I interrupted this early industrial experiment, but the burgeoning present day solar industry has long since eclipsed this early milestone with sophisticated systems and large installations delivering megawatts of solar-derived electric power, as well as millions of rooftop solar hot water systems supplementing household heating requirements around the world. Today, much of the present solar power industry is directed towards photovoltaic technologies, but parabolic dish and trough type solar reflectors remain an important primary component in many installations for directing a greatly intensified sunlight beam on a relatively small target collector.

The quality and efficiency of the reflective surface of a reflector is obviously important. 95.5% is about the highest level of reflection practical for extended outdoor uses, which is 10-20% more reflective than normal glass mirrors, aluminum foil and Mylar reflector film. Total spectral reflectivity of commercially available reflector panels for the light spectrum between 450 and 2500 mn is at or above 93.5% at a 55-70 degree light angle.

Inexpensive reflective sheet material can be cut and attached to flat, rigid and smooth substrates of wood or metal to form a single pane or faceted reflector, by relatively unskilled persons using no more than basic hand tools. Such reflectors can be positioned by trial and error to obtain a notable redirection and/or concentration of solar energy whether for higher light intensity or heating purposes.

"Lighting sheet" is a general industry term used to describe high quality reflective aluminum produced to meet specific optical properties, used in various lighting applications. Its reflective quality may be inherent or the result of a surface treatment or coating or an additional layer. The base material needs to be further specified to meet the associated structural requirements. Sheet stock that is structurally suitable but not highly reflective may be adapted by application of a thin Mylar film which may be obtained in roll form and applied with an adhesive to the sheet stock before or after it is formed, preferably before.

Multiple simple, flat reflectors can be directed to reflect light to a common collection point. A flat multi-mirror concentrating reflector array called a heliostat can duplicate a section of a parabolic reflector and focus flat sunlight reflections to a single collection point, albeit with less concentration than a curved reflector can achieve. Of course, more and smaller flat mirrors enable a more concentrated and smaller collection point than fewer larger mirrors.

Convex or concave support structures can be calculated and fabricated, to which flat or flexible reflective sheet material can be cut and fitted to form convex or concave semicircular reflectors such as parabolic or constant radius trough reflectors that focus collected light on a collector positioned at the focal point of the reflector. A reflector support can easily be figured with a one or two axis, manual or automatic tracker mechanism to keep the reflector pointed directly at the sun. The collector in turn, such as a pipe or conduit containing a thermal transfer fluid, or a photo electric device or array, can then be connected to an energy conversion device such, as a steam engine, suitable for applying the available power. Fabrication of efficient semicircular trough type reflector systems with a degree of precision normally requires a somewhat more sophisticated set of instructions, materials, tools, time, and/or a more skilled fabricator. In a commercial setting or context, this equates to additional cost.

SUMMARY OF THE INVENTION

It is a goal of the invention to provide a method for simple, onsite fabrication of a trough type solar reflector or reflector array having a pre-defined and self supporting arc of reflection with a focal point at a known length from the reflector face. Such a reflector should be able to be pre-engineered and pre-fabricated at a source point, from flexible reflective sheet material, shipped flat to the desired reflector site, then be easily transformed by manual labor or with the aid of simple hand tools into a formed solar reflector, easily secured to a simple support system as a single piece reflector or in a reflector array for collecting solar energy. Supports for the light weight reflectors of the invention will not need to be as robust as support systems for heavier reflectors. Individual reflectors can be arranged as abutting end to end and configured to have a common focus line. For example, two reflector segments can be arranged end to end to form a single parabolic reflector. As another example, two or more reflectors can be arrayed side by side to form an elongate trough reflector with an extended line of focus.

The invention in one aspect relates to a solar energy collection system with a simple curved surface trough reflector for concentrating solar radiation along a line of focus, that consists of a sheet of light reflecting material with a pair of curved bend lines formed along opposite edges of the sheet so as to divide the sheet into sections consisting of a curved surface center section joined by the formed bend lines to two respective curved rib sections, where the curvature of the bend lines and the rib sections define the surface curvature of the center section, with the curved rib sections being joined by respective additional formed curved bend lines to respective sheet edge sections. There is a solar collector for absorbing and converting concentrated solar energy into an alternate energy form, and a circuit for removing the alternate energy from the system.

In another aspect, there is provided a method for forming a simple curved surface structure, consisting of scoring a sheet of material with opposing pairs of parallel curved bend lines along one pair of opposing edges of the sheet so as to divide the sheet into sections including a pre-engineered curved surface center section joined by inner bend lines to curved ribs, the curved ribs being joined by outer bend lines to respective curved edges; bending the curved ribs along the inner curved bend lines to nominally right angles relative to the curved surface center section, and the curved edges to nominally right angles relative to the curved ribs. The other pair of opposing edges may be scored and formed as straight ribs or right angle reinforcing flanges, or as twice folded flanges or straight ribs with straight edges formed at right angles that in combination with the curved edges provide full perimeter support flats for mounting the structure to a support system and/or attaching a backing sheet to the formed structure.

A backing sheet may be secured to the straight edges and curved edges along a portion or the full perimeter of the structure, taking the curvature of the curved surface center section so as to form a relatively rigid box-like curved enclosure. A larger backing sheet may enclose individual curved structures and extend to connecting two or more adjacent structures, either end to end, or side to side, or both, and also function as the principal reflecting surface. The means of securing the backing sheet to the curved edges and straight edges of the individual curved structures may be any common means including but not limited to continuous or periodic bonding by folding and crimping, mechanical fasteners, continuous or spot welding, or adhesives. The exposed sides of either or both of the curved surface center section or the backing sheet, may have or be configured to have a reflective surface suitable for reflecting, and concentrating or diffusing according to its curvature, heat, light and/or electromagnetic radiation.

In yet another aspect, the invention relates to a method for reinforcing a line of intersection between two surfaces or panel sections, by installing an elongate reinforcing member along the line of intersection, where the reinforcing member is a corrugated metallic material wherein corrugations run widthwise across the member and the member is configured with a lengthwise bend angle sized to match the angle of the intersection between the two surfaces or panel sections.

A yet further aspect includes a curved surface consisting of a sheet of material with a pair of curved bend lines formed along opposite edges of the sheet so as to divide the sheet into sections comprising a curved surface center section joined by the formed curved bend lines to two respective curved ribs, where the curvature of the bend lines and the ribs defines the curvature of the center section. The curved center section and integral curved ribs formed from a single sheet may have a stand-alone function as a reflector or provide a defining curvature and reinforcing function for a larger sheet of reflective material.

BRIEF DESCRIPTION OF THE FIGURES

FIG. 8 is an end view of two curved structures of the invention secured in a rotatable framework and secured together in an end to end relationship by and defining the curvature of a common reflector sheet.

DETAILED DESCRIPTION OF THE INVENTION

The invention is susceptible of numerous embodiments of both method and apparatus. What is described here is illustrative but not exhaustive of the scope of the invention.

Figure 1:
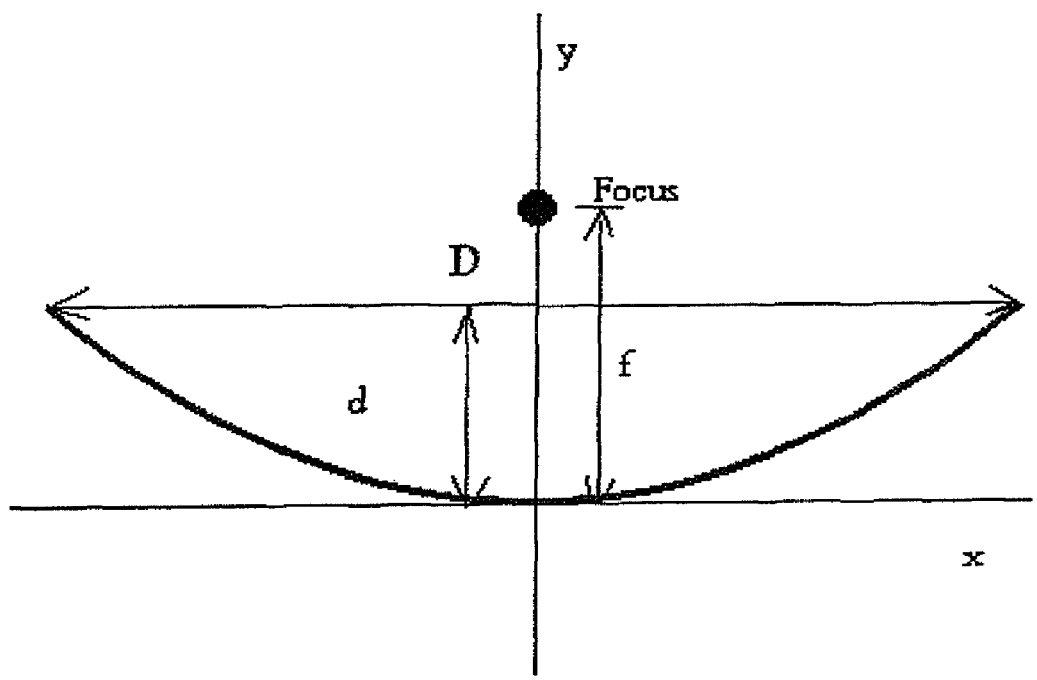
FIG. 1 is a diagrammatic illustration of a parabolic cross section of a trough reflector.

Referring to FIG. 1, simplifying the standard equations for a parabola to obtain the equation of the parabola involving the focal distance f, we have $$y=x^2/4f$$

For the parabolic cross section profile of a trough reflector as shown in FIG. 1, D is the straight line or cord line length of the arc, d is the depth of the arc, and f is the focal distance. The points (D/2,d) and (−D/2,d) are on the parabola, hence $$d=(D/2)^2/4f$$

This gives a relationship between the length of arc D, the depth d and the focal distance f of a parabolic arc or reflector of $$f=D^2/16d$$

Then, for a relatively small section of a parabola at the axis of symmetry, in particular where D is equal or greater than about 10 d; then $$f=100d^2/16d=100d/16=\sim 6d$$

It will be readily apparent that an arc of uniform diameter can be used to approximate a small, symmetrical portion of a parabolic arc where d is much smaller than D. From the equations for a circle, for an arc of constant radius r, where D=10 d, then $$r=12d=\sim 2f$$

This suggests that a practical reflector design can be achieved by forming a panel of reflective sheet stock with an arc or curvature of radius r to a depth d and length D where D is equal or greater than about 10 d and d is equal to about R/12. Such a panel will have an effective focal length f of about r/2, a very sufficient estimate if the focal point need not be too precise. The ratio of D/d can be greater, of course, but not much smaller as the approximation between the curve of constant radius and a true parabola fails rapidly as the arc lengthens and the D/d ratio decreases. Armed with this simple reflector design principle, it is not difficult to create a total solar collector design utilizing one or more reflector elements fabricated as follows.

Figure 2:
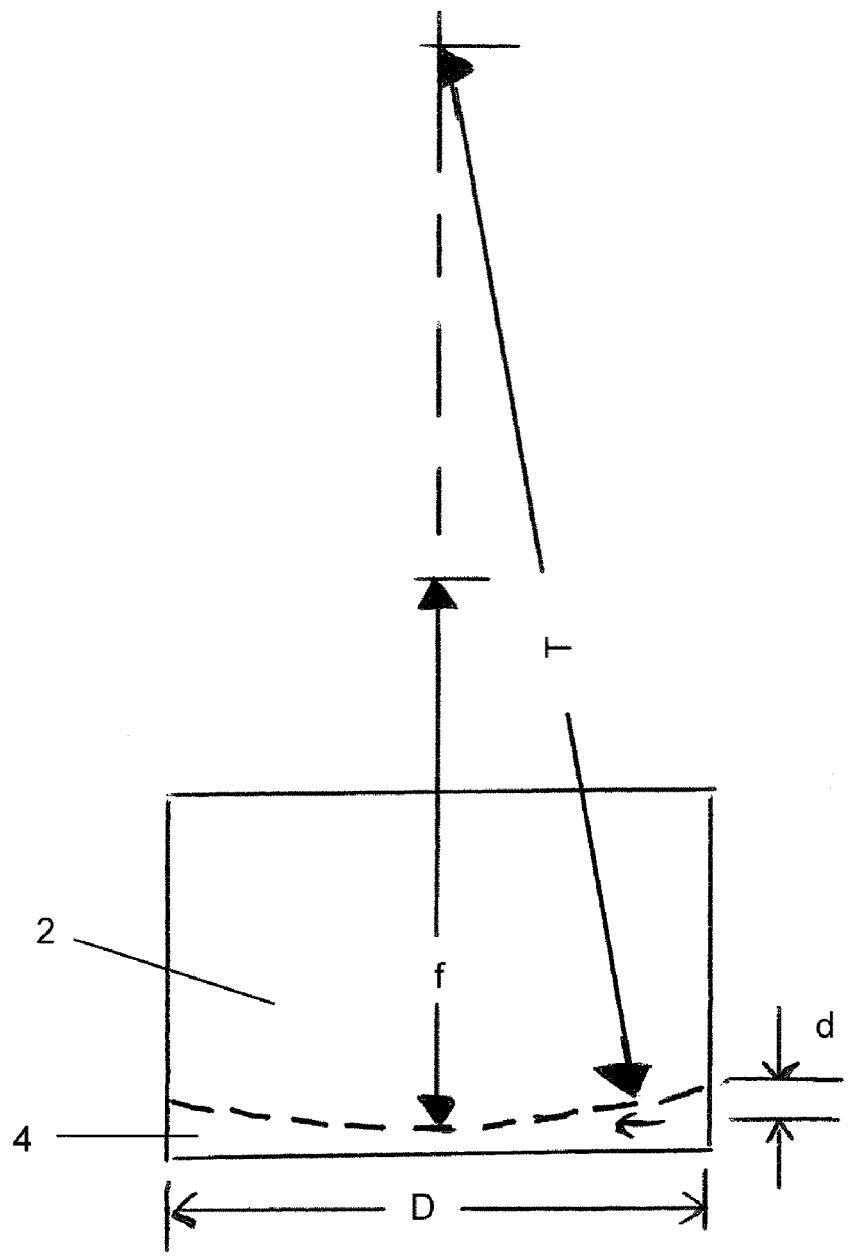
FIG. 2 is a diagrammatic illustration of a layout process for applying a forming line or bend line on a sheet of reflective material.

Referring to FIG. 2, a curve of constant radius where r is equal to at least about ~12 d, and cord length D is at least about 10 d is plotted and traced or scribed onto a sheet 2 of length D to define or be cut as a curved rib template 4 for defining the cross section profile or shape of a constant radius trough type solar reflector. Using an arc of longer radius relative to the length of the sheet material consumes less width or surface area along the edge of the sheet material, but places the focal point further away from the reflector face by half.

Figure 3:
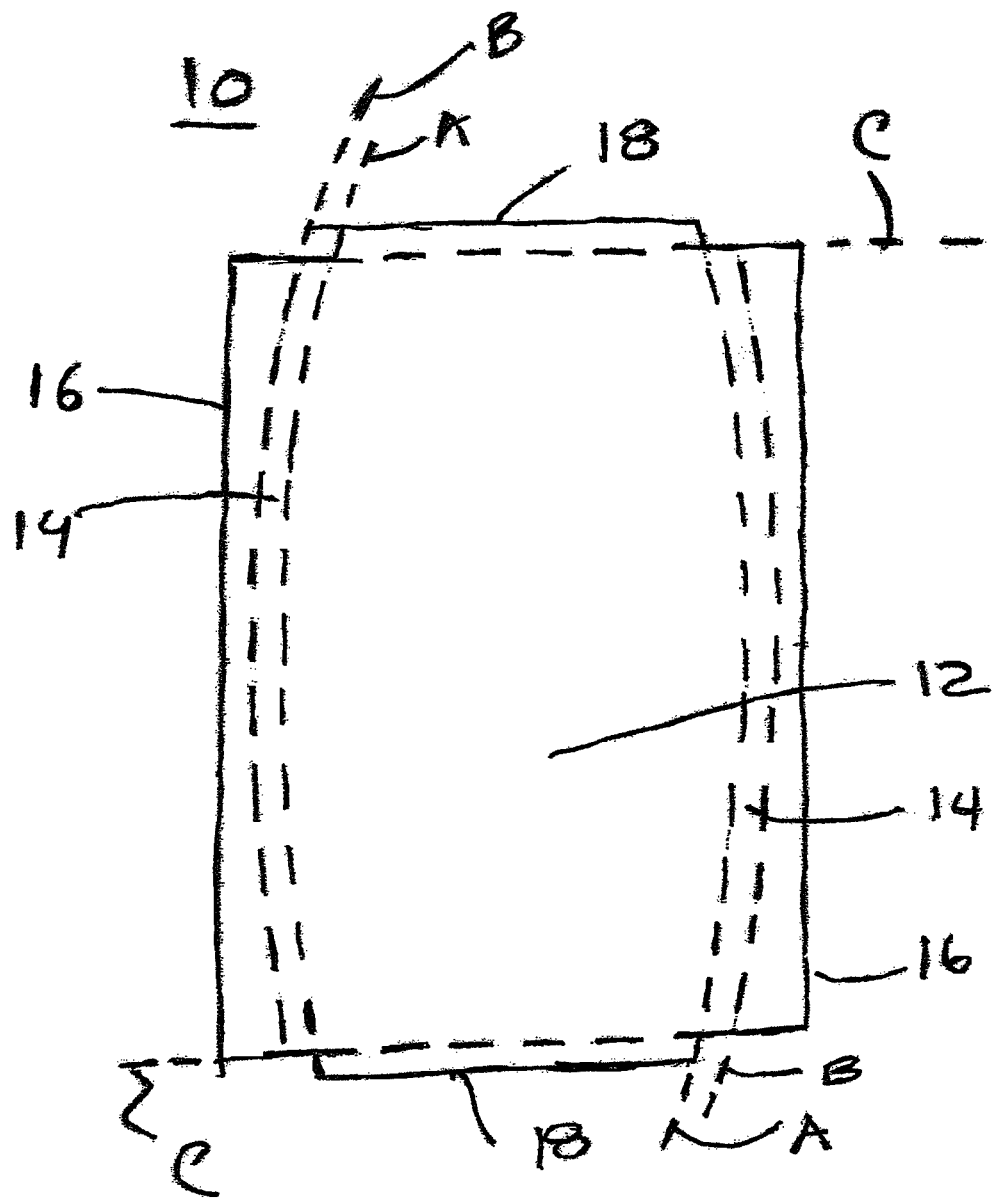
FIG. 3 is diagrammatic illustration of a sheet of reflective material scored with bend lines by which it may be formed into a curved surface reflector.
Figure 4:
FIG. 4 is a photo of a reflector of the invention, illustrating the three dimensional geometry achieved by the forming of the sheet material of FIG. 3.

Referring to FIGS. 3 and 4, an identical but opposing constant radius arc is plotted on the opposing edge of sheet 2 of FIG. 3 so as to form bend lines defining a reflector surface 12. A set of bend lines B of the same arc where drawn nominally parallel to and outboard of bend lines A to define curved rib sections 14 and long side edges 16, and finally if the end edges were marked with straight bend lines C and similarly scored for bending, it would look like the pre-engineered solar reflector sheet 10 of FIG. 3.

Referring to FIGS. 3 and 4, flexible, reflective sheet 10 is a sheet of aluminum with a polished surface, and may be referred to in the industry as a "lighting sheet", but here has the requisite further properties as well. In this embodiment, for example, the material used was aluminum alloy 1090, Temper H19, Gauge 0.032, Clear Anodized. In another embodiment a 5052, 0.032 thick, H32 temper aluminum sheet material, faced with a Mylar sheet for the reflecting surface, was used for the "score and form" method of the invention. Other and more or less reflective sheet materials are available and within the scope of the invention.

Referring still to FIGS. 3 and 4, in one embodiment, a 4×8 foot sheet of reflective material was used to make a reflector of the invention. Using a 10 foot radius r resulted in an arc of about 43.6 degrees with a D=96", d=9.6", and f=5 feet. In another embodiment, a 4×4 foot reflective sheet was prepared in the same manner, using the same radius and having the same focal length but having respectively smaller arc dimensions. The overall width of the two reflectors at their mid points was, of course, about the same, 42 inches.

Sheet 10 may be made of material other than aluminum, including but not limited to composite layered structures with a flexible backing material prepared with a reflective coating or laminated to a reflective surface layer. It will be susceptible of scoring or perforating or otherwise enabling or creating a precisely placed, small radius bend line in the sheet by which the sheet may be further formed into a three dimensional curved surface structure, where the formed angles cause the curved ribs to draw the reflector face into a curved or semi-circular surface, and the bend angles provide relative rigidity to the structure. Scoring is most effective for creating a bend line when done on what is intended to be the outside corner of the formed bend line. The term "scoring" for purposes of this disclosure and the appended claims extends to marking, perforating, and/or otherwise affixing the location of the intended bend lines on the sheet. Simple scoring of the sheet stock does not add heat or cause deformation.

Pre-engineered solar reflector sheet 10 is scored along bend lines A, B, and C as described above, after a small section in each corner where score lines A and C intersect is removed. Scored lines A and C define reflector surface 16 framed by straight short edges 18 and opposing curved ribs 14 define the arc or curvature of the reflector surface when formed. Long edges 16 add rigidity to their respective curved ribs 14 as well as provide convenient mounting flanges for the formed reflector. Long edges 16 will be parallel to and have the same curvature as surface 12. Short edges 18 will add rigidity to the end or short edges of the reflector surface 12 when formed. Score lines A and C are on the face of the sheet, while score lines B are on the backside of the sheet, to facilitate forming their respective bends in the intended direction. Straight short edges 18 may be dimensioned and scored again (not shown) with a parallel straight line outboard of score line C such that the straight short edge can be twice folded or double folded whereby the outer flange or straight edge (analogous to a curved long edge 16, whether folded in or out from the inner flange or straight rib (analogous to a curved rib 14), is thereafter parallel to surface 12 and in the same curved plane as curved long edges 16. A scored and formed bend line as a joint between a rib and the surface, particularly if reinforced, is a precise and reliable fitment of structural elements of what in other structures may be a poorly fitted individual parts into an imprecise and unreliable joint.

Figure 7:
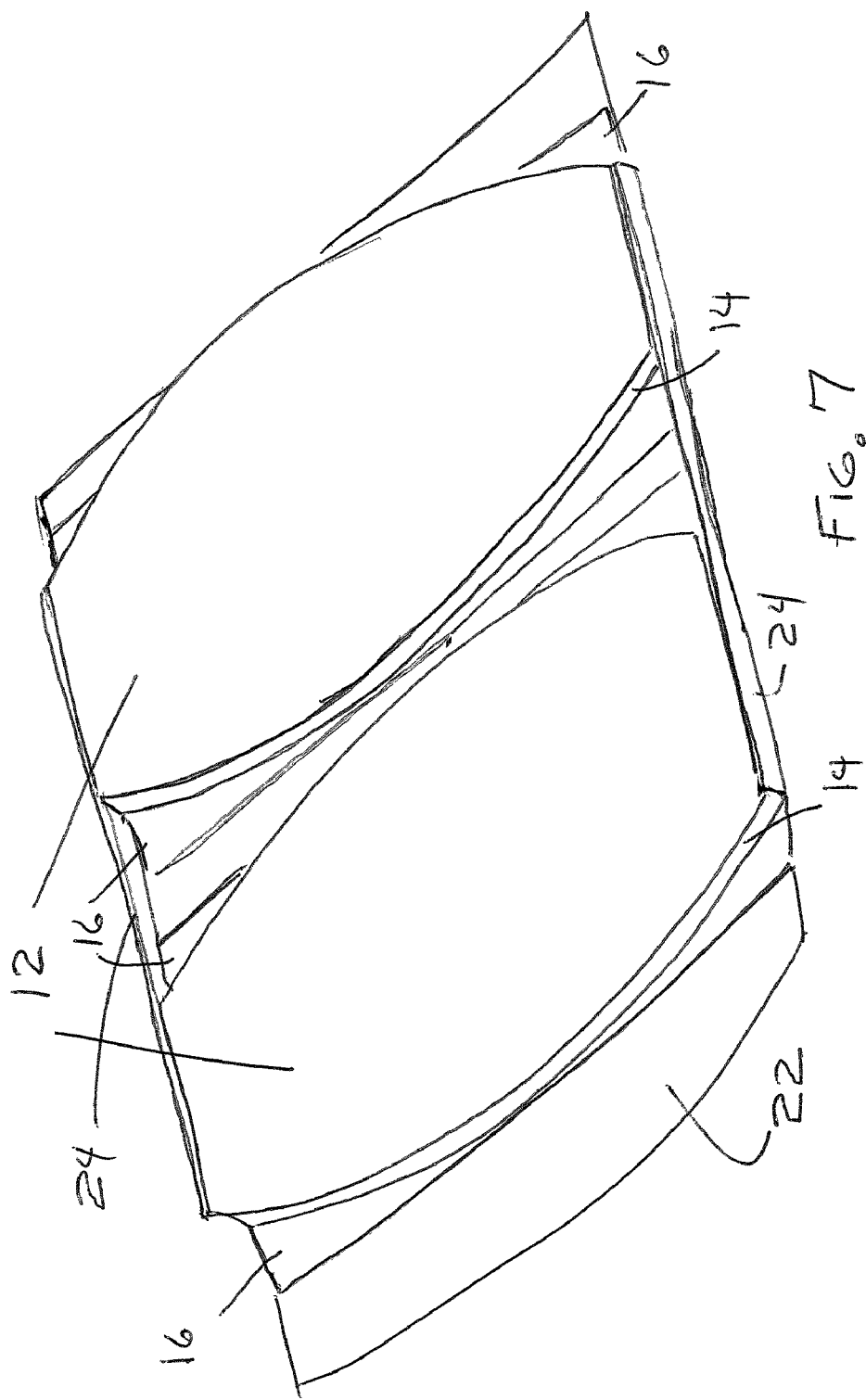
FIG. 7 is a perspective view of two curved structures of the invention being secured together in a side by side relationship by and providing a curvature to a common backing sheet.

Referring to FIG. 7, another sheet 22 of nominally the same dimension or a multiple of the dimension of sheet 10 may then be secured to curved long edges 16 and to double folded short straight edges 18 as a backside sheet so as to form a single or an array of relatively thin, curved box structures or enclosures as shown. Either or both the exposed side of backside sheet 22 and surfaces 12 can function as the structural form or base for a reflective surface.

While a constant radius approximation of a parabola has been described and explained as an easily produced template for obtaining a functional reflector, it will be readily apparent that a true parabolic curve or template with an accurately determined focal point can equally well be created and used for laying out the curved bend lines that will define the curvature of the formed structure.

In one embodiment, sheet 10 is a sheet of somewhat flexible material such as aluminum sheet stock with a suitable surface finish for the desired degree of reflectivity. The scoring of a large number of sheets may be accomplished at a source or intermediate location rather than on site. After the required number of sheets has been pre-engineered with bend lines in the manner described above, they may be readily packaged, flat, and shipped to the site for assembly and installation as reflector components such as in a solar energy collection system.

The pre-engineered sheet 10 of FIG. 3 is formed, typically on site, by manipulating opposing curved ribs 14 and curved long edges 16 so as to bend the curved ribs to nominally right angles relative to reflector surface 12, and the curved long edges to nominally parallel with reflector surface 12. The exact angle of the surface 12 to curved rib 14 is in part a function of the radius of the arc; the shorter the radius, the more acute the angle between the reflector surface and the curved rib. The term "right angle" as used in this context is meant to include the variation from 90 degrees caused by the curvature of the bend line and the tension in the sheet material, which could alter the bend angle by several degrees.

The forming manipulations can be done several ways. One manual method is by having two fabricators, one working each side of the sheet. The bends can be gradually and progressively affected by hand manipulation or by using one or a set of suitable hand tools, until the curved long edges 16 and curved ribs 14 are bent uniformly to their relatively rigid nominally right angle relationship to the surface section. This forming operation necessarily alters the contour of surface 12, requiring it to take the curvature of a shallow trough-like form or curved plane corresponding to the pre-engineered arc or curvature of the ribs 14. Curved ribs 14 and long edges 16 are similarly affected, being pulled into a curved surface defined by the shape of the edge of the intersecting element, with the resulting final curvature of each abutting component intersecting at their respective common curved bend lines, as is visually apparent in FIG. 4.

The original length D of the curve inscribed on the planar sheet material is functionally altered slightly in the finished form of the reflector surface by its deformation from a flat sheet when the arc was scribed and scored, into a curved surface where the cord line of the arc is actually somewhat shorter than the sheet, decreasing the effective radius and focal length of the formed reflector surface somewhat. These affects can be included in the original calculations if desired, as by use of a computer-generated template, or simply ignored as negligible in the performance of the reflector.

Straight short edges 18 are likewise folded at bend lines C to right angles relative to surface 12, providing rigidity to the ends of the reflector surface and lending further support and rigidity to the overall formed reflector. As noted above, straight short edges 18 may be double scored and twice folded (not shown) analogous to the curved ribs 14 and long edges 16 so as to form two additional flats for support or for attachment of a backside sheet (not shown).

Referring to FIG. 7 again, the top and bottom short edges 18 (not visible in this figure) which are the butt ends of the two formed curved structures secured to the common backing sheet 22, are secured together at the top and bottom of the two curved structure assembly by connecting members 24, which may be flat stock or angle stock or be of another useful cross section profile.

Furthermore, the score and form structure described may be executed in a concave or convex form as the structural support for a backside sheet, which when attached may be considered or used as the primary reflector surface of the structure. One benefit of this embodiment is that the full surface area of the backside sheet is available as a reflective surface.

Referring to FIG. 8, there is illustrated by an end view two curved structures of the invention, their respective curved ribs 14 showing, mounted in a rotatable frame 24, and connected end to end by and providing curvature to a reflective sheet 22.

While machine forming of the edge supports is within the scope of the invention, the ease with which unskilled fabricators can form the flat sheet into a pre-engineered reflector, on site, with none or minimal tools, is considered to be a benefit of the invention. Furthermore, the simplicity of the initial engineering and layout permits the reflector dimensions to be quickly adapted to fit readily available material sheet sizes and/or mounting constraints without the aid of computers or special skills, whether the sheets are prepared at a source or at the intended reflector site.

The nominal right angles introduced by folding of the scored sheet materials may be vulnerable to fatigue, cracking, and separation, causing gradual deformation of the reflector. The formed fold lines can be reinforced by a variety of means in order to provide greater resistance to vibration, high wind or other environmental factors that might place stress on the structure. In one embodiment, short sections of right angle brackets are easily applied, using, for example silicone as the adhesive agent. Other means of periodic or continuous application of reinforcing members to the formed fold lines of the sheet material are within the scope of the invention.

Figure 5:
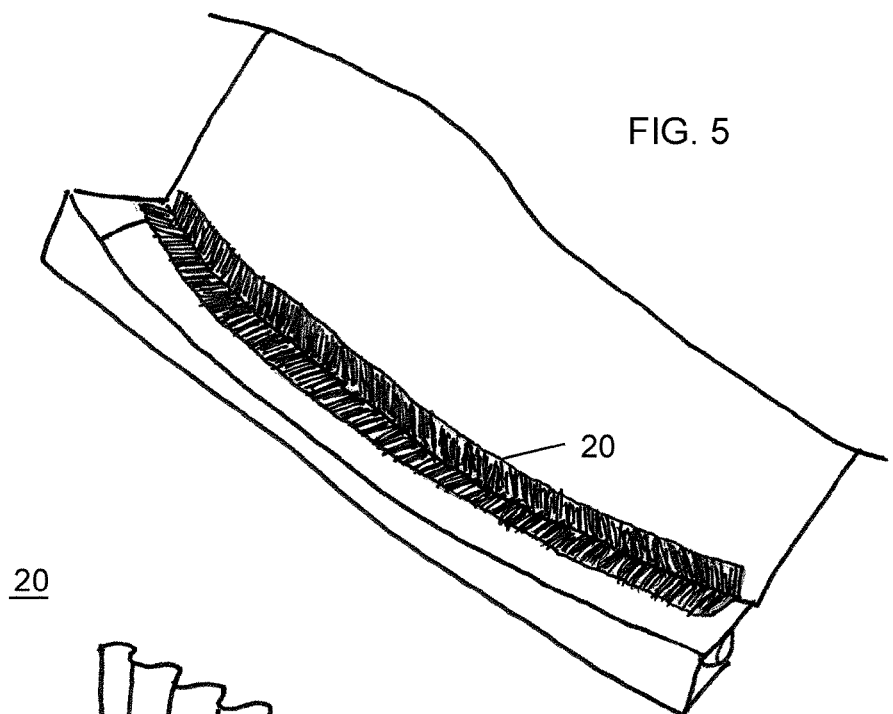
FIG. 5 is a partial perspective view of the underside, inside corner of a reflector of the invention, illustrated with a corrugated reinforcing member applied to the formed bend line.
Figure 6:
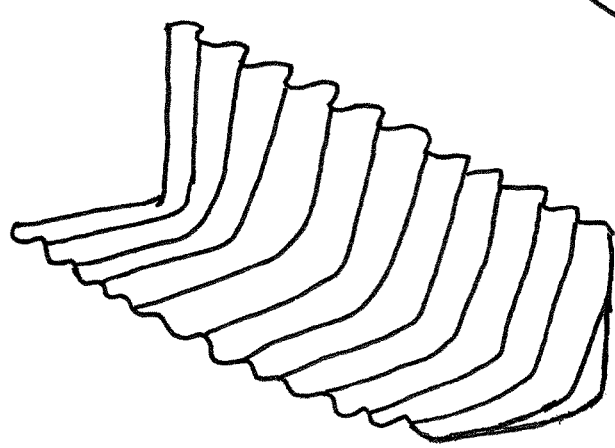
FIG. 6 is a close up partial perspective view of the reinforcing member of FIG. 5.

Referring to FIGS. 5 and 6, one form of a right angle reinforcement member, of long length and of good right angle strength, is unexpectedly compliant with respect to being fitted to the large radius curvature and twist present in both planes of the right angle formed fold lines of reflectors of the invention. It consists of a long strip of aluminum sheet, about 1.5 inches wide although it could be more or less, first corrugated crosswise to its length, and then formed to the desired angle, nominally a right angle. The material of this embodiment is of soft to medium ductility or hardness, such as aluminum alloy 5052, Temper H34, Gauge 0.010, and has been shown to accept machine bending at a radius about the same or somewhat larger than the depth of its corrugations to a right angle, retain an easy ability to twist gradually to fit the curved corners of the formed reflector, and still give substantial reinforcement to the formed reflector bend lines when installed with a continuous adhesive material such as silicon. Other grades of materials susceptible of corrugating and bending in the manner described, and other forms and manner of installation, are within the scope of the invention.

The flexible corrugated angle reinforcing member may be made from a strip of suitable sheet stock that is run lengthwise through a corrugating device such as a rotary device that reforms the strip into a continuous pattern of relatively uniform corrugations in the order of 8 per inch, crown to crown, about ⅛ inch deep, oriented crossways on the strip. The corrugated strip may be thereafter subjected to lengthwise bending on a mechanical brake, where it is bent to a right angle or such other interior angle as is required to be reinforced. It may be bent with a relatively gentle or granular inner bend radius of, in this example, about ⅛ inch, so that the corrugations retain at least a recognizable shape with respect to their original cross section profile, at and around the bend line. A limited degree of fracturing of material and deformation of the corrugations cross section from the ideal form, at the bend line, due to the stresses introduced in the bending process, is likely and is acceptable. The resulting angle reinforcement member is uniquely flexible over its length in either or both planes, and is yet relatively inflexible with respect to its right angle reinforcement function, particularly when applied to an interior or inside angle, one less than 180 degrees, of intersecting planar sections. In this embodiment, it is easily applied with a continuous bead or coat of adhesive such as but not limited to natural cure silicone, to the inside angles of the fold lines of a folded reflector of the invention, extending lengthwise over a portion or the full length of the fold line.

It will be seen that the lengthwise flexibility of the angle reinforcing member allows a long length reinforcing member of the invention to be easily conformed to non-linear fold lines or lines of intersection of two planar elements. The width of the corrugated reinforcing member and the geometry of its corrugation pattern generally control or define the degree of curvature of a fold line to which it can be conformed. A shorter width reinforcing member, higher number corrugations per unit length, and higher height of corrugations increases flexibility of the member, all other things being equal. Numerous other mechanical fastener and/or adhesive/adhering means of attachment for attaining the reinforcing benefit of a lengthwise flexible corrugated angle reinforcing member will be readily apparent to one of ordinary skill in the art, and are within the scope of the invention.

One or an array of formed reflectors of the invention may be mounted on a simple stationary support orientated for maximum sun exposure, or on a single or multi axis rotable support configured with a tracker for keeping the reflector or reflector array continuously pointed at the sun.

Formed reflectors may be arrayed long side to long side, or short side to short side, or a combination of both. They may be oriented on their support structures with individual lines of focus or a common line of focus at respective distances of f from the reflector surface.

As is readily understood, to collect the intense concentration of radiation present at the line of focus, a suitable linear light to heat or photovoltaic converter/collector device must be configured there as a target of the radiation, and be connected to an energy storage and/or distribution circuit or system. The collector may be a pipe or tube carrying water or other thermal transfer fluid, or be a photo voltaic or other solid state device, or be of such other solar radiation collector/converter technology as may be available. The collected energy in whatever form delivered by the collector, be it hot air, hot fluid, steam, superheated steam, or electrical current or otherwise, is delivered to a suitable energy storage device or distribution system, or directly to the end load for producing the desired work.

As in the case of all solar energy reflector/collector systems, the power output is highly dependent on several variables; location, orientation of the reflector array with respect to the sun, available hours of sunlight, atmospheric conditions that reduce the intensity of solar radiation hitting the reflectors, the reflective quality and efficiency of the reflective surface, the precision of focus of the reflector on the collector, the efficiency of the collector at the available radiation level, and the impedance matching of the collector output to the load for maximum power delivery.

A hypothetical scenario illustrating the benefits of the methodology of the invention follows. A third world country has a need for low cost energy sources in remote locations. There is a shortage of money, skilled help, conventional fuels, and money. Solar energy is available.

A solar array of reflectors of the invention mounted on a simple one-axis rotable mount controlled by a solar operated tracker, configured with a hot water/steam tube collector connected to a steam engine, would be an ideal solution. Pre-engineered panels of the invention can be supplied to the site along with the tracker mechanism, collector, steam engine and associated plumbing fixtures. A mount can be fabricated from local materials or included in the kit. The entire system can be assembled on site by local labor with minimal supervision, providing reliable mechanical power, with no energy costs, whenever sufficient sun was available.

There are other and numerous examples and embodiments within the scope of the invention. For example, there is a method for forming a solar reflector comprising: (1) using a flexible sheet material with a reflective surface; scoring a pair of parallel bend lines each in the form of an arc of diameter r along the edge of each of one pair of opposing edges of a flat sheet of the sheet material, where r is greater than the cord line length D of the edge and the arc has a depth d than is about D/10 or less, D/8 being a practical upper limit, and the pairs of arcs are opposed in orientation, thereby dividing the flat sheet into a pre-engineered reflector surface having a barrel shape defined by a pair of opposing curved sides, to which are joined by the inner curved bend lines, the curved ribs, and to the curved ribs by the outer bend line, the curved edges; and (2) bending the curved ribs down and the curved edges out and up along their respective curved bend lines to nominally right angles, the curved ribs at right angles to the reflector surface and the curved long edges to nominally at right angles relative to the curved ribs, whereby the reflector surface takes the curvature of the rib arcs so as to form a trough like reflector surface and the curved ribs and curved edges take the curvature of the reflector edge.

The invention extends to curved surface embodiments with no curved edge sections; that is, there may be a central, curved surface section that may be used as a reflector or a base for a reflective coating or conformable reflective layer, attached by curved bend lines to curved ribs that are formed at the curved bend lines to nominal right angles to the surface section so that the curvature of the ribs defines through the formed bend lines the curvature of the surface.

The invention also extends to embodiments having the curves inverted in a concave or hour-glass fashion rather than a convex or barrel shape fashion so that the mid section of the reflector is narrower than the ends. The backside of the curved surface, or the exposed side of a backside sheet if applied as described in other embodiments, would be functional as a curved reflector for concentrating reflected heat, light or electromagnetic radiation.

The invention extends to embodiments where the curved bend lines between the reflector surface and the curved ribs varies over its length in the profile of its curvature or even reverses its direction of curvature.

The invention extends to embodiments where the curved ribs are bent up relative to the reflective surface, and the curved edges, if provided, are bent out and down from the curved ribs so as to be nominally parallel to the reflector surface. Scoring to locate curved or straight bend lines and facilitate bending is preferably done on what will be the outside corner of the formed bend.

As yet other examples, there is a reflector formed by the above method. There is a solar collection system incorporating this reflector. The reflector may comprise angle reinforcing members installed along the formed bend lines. The reflector section may be reinforced or stiffened by addition of additional ribs to its backside.

As still another aspect of the invention, there is a lengthwise flexible reinforcing member for strengthening the formed bend lines of the reflector, or of other inside corners of intersecting wall sections of structures, adaptive in particular to curved and/or twisting corner lines. It comprises an elongate length of corrugated material wherein corrugations of relatively equal width and height run crosswise or span wise across the member, the height defining the thickness of the reinforcing member, the reinforcing member being configured with a lengthwise center bend line to the desired corner angle wherein the material when bent retains a majority of its corrugation depth or thickness.

Further aspects of the invention include a method for reinforcing an intersecting angle between two planar surfaces comprising installing the lengthwise flexible angle reinforcing member above, at the intersecting angle, with a continuous or frequent fastener scheme such as but not limited to a continuous bead of adhesive and/or frequent welds or fasteners. The angle may be a right angle or be more or less than a right angle. The corner or intersecting of walls or bend line may have a curvature or twist that makes rigid corner enforcement members impractical. The reinforcing member of the invention is conformable to the non-linear bend line and twist.

Yet another example is the reflector described above reinforced with the angle reinforcing members described above.

It should be noted that the methodology of the invention avoids subjecting the sheet to mechanical forming methods of powered molds and dies that stretch form or otherwise alter the flatness and basic two dimensional shape of the sheet by other than simple folding. In other words, the sections of the pre-engineered sheet material, after scoring to locate bend lines and notching of corners to enable folding, retain their original dimensions after being formed into a unitary, curved surface structure. It would be the same flat sheet with the same original sections and dimensions if unfolded, as it was before being folded.

The claims as originally submitted with this specification are hereby incorporated by reference as a part of this disclosure for all purposes, irrespective of subsequent amendments. Other and many variations and examples of the invention including its forms and methods of using the invention for the benefits described, will be readily apparent to those skilled in the art from the above description, figures and the appended claims and equivalents thereof.

I claim:

1. A method for reinforcing a curved line of intersection between two surfaces comprising installing an elongate reinforcing member along the curved line of intersection, the reinforcing member comprising corrugated metallic material wherein corrugations run widthwise across the member, and further configured with a lengthwise bend angle sized to match an angle of the intersection between the two surfaces.

2. The method of claim 1, further comprising:
bonding the reinforcing member to the two surfaces with a layer of adhesive.

3. A structure with a curved surface comprising:
a sheet of material with a pair of curved bend lines formed along opposite edges of the sheet so as to divide the sheet into sections comprising a curved surface joined by the formed said bend lines to two respective curved ribs, the curvature of said bend lines and said ribs defining the curvature of the surface; and
a lengthwise flexible and twistable elongate reinforcing member bonded to the inside corner of a said formed curved bend line, the reinforcing member comprising corrugated material wherein corrugations run widthwise across the member and configured with a lengthwise bend angle sized to match the angle of the formed curved bend line.

4. The structure of claim 3, further comprising, the curved ribs being joined by respective additional formed curved bend lines to respective curved edges.

5. The structure of claim 4, further comprising an adhesive layer bonding the reinforcing member to the sections connected by the formed curved bend line.

6. A curved surface reflector comprising the structure of claim 3.

7. A method for forming a structure with a curved surface comprising:
scoring a sheet of material with opposing pairs of parallel curved bend lines along one pair of opposing edges of the sheet, thereby dividing the sheet by two inner and two outer curved bend lines into sections comprising a center section joined by the inner curved bend lines to curved ribs, the curved ribs being joined by the outer curved bend lines to respective curved edges;
bending the curved ribs along the inner curved bend lines to nominally right angles relative to the center section whereby the center section becomes a curved surface, and bending the curved edges along the outer curved bend lines to nominally right angles relative to the curved ribs; and
applying a lengthwise flexible and twistable elongate reinforcing member to the inside corner of a formed said bend line, the reinforcing member comprising corrugated material wherein corrugations run widthwise across the member and configured with a lengthwise bend angle sized to match the angle of the formed said bend line.

8. The method of claim 7, said applying the reinforcing member comprising using an adhesive for bonding the reinforcing member to the sections connected by the formed said bend line.

9. A method for forming a structure with a curved surface comprising:
scoring a sheet of material with opposing pairs of parallel curved bend lines along one pair of opposing edges of the sheet, thereby dividing the sheet by two inner and two outer curved bend lines into sections comprising a center section joined by the inner curved bend lines to curved ribs, the curved ribs being joined by the outer curved bend lines to respective curved edges;
scoring the sheet of material with opposing pairs of parallel straight bend lines along a second pair of opposing edges of the sheet, thereby further dividing the sheet by two inner and two outer straight bend lines into sections comprising the center section joined by the inner straight bend lines to straight ribs, the straight ribs being joined by the outer straight bend lines to respective straight edges;
removing the corner sections of the sheet where the outer curved bend lines and the outer straight bend lines intersect;
bending the curved ribs along the inner curved bend lines to nominally right angles relative to the center section whereby the center section becomes a curved surface, and bending the curved edges along the outer curved bend lines to nominally right angles relative to the curved ribs;
bending the straight ribs along the inner straight bend lines to nominally right angles relative to the center section, and bending the straight edges along the outer straight bend lines to nominally right angles relative to the straight ribs; and securing a second sheet of material to the straight edges and the curved edges whereby the second sheet of material takes a curvature parallel to the curved surface.

10. The method of claim 9, further comprising:
installing an elongate reinforcing member along a formed said bend line.

11. A solar energy collection system comprising:
a reflector for concentrating solar radiation comprising a sheet of light reflecting material with a pair of curved bend lines formed along a pair of opposite edges of the sheet so as to divide the sheet into sections comprising a curved surface center section joined by the formed said curved bend lines to two respective curved rib sections, the curvature of said bend lines and said rib sections defining the curvature of the center section, the curved rib sections being joined by respective additional formed curved bend lines to respective curved edge sections;
a lengthwise flexible and twistable elongate reinforcing member bonded by a continuous adhesive layer to an inside corner of a said formed curved bend line, the reinforcing member comprising corrugated material wherein corrugations run widthwise across the member, and configured with a lengthwise bend angle sized to match the angle of the formed curved bend line;
a solar collector for absorbing and converting concentrated solar radiation into an alternate energy form; and
a circuit for removing the alternate energy from the system.

12. The system of claim 11, the reflector being a trough reflector with a line of focus, the solar collector comprising a conduit positioned along the line of focus and filed with a heat absorbent fluid, the circuit comprising a fluid circulation system connected to the conduit for circulating the heat absorbent fluid.

13. The system of claim 12, further comprising a support system to which the reflector and solar collector are mounted.

14. The system of claim 13, further comprising a solar tracker system by which the reflector is controlled so as to be directed towards the sun.

* * * * *